United States Patent
Shoda et al.

(10) Patent No.: US 11,920,022 B2
(45) Date of Patent: Mar. 5, 2024

(54) RUBBER COMPOSITION AND TIRE

(71) Applicant: BRIDGESTONE CORPORATION, Tokyo (JP)

(72) Inventors: Yasuhiro Shoda, Tokyo (JP); Olivier Tardif, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 555 days.

(21) Appl. No.: 17/274,328

(22) PCT Filed: Jul. 31, 2019

(86) PCT No.: PCT/JP2019/030027
§ 371 (c)(1),
(2) Date: Mar. 8, 2021

(87) PCT Pub. No.: WO2020/054239
PCT Pub. Date: Mar. 19, 2020

(65) Prior Publication Data
US 2021/0340363 A1 Nov. 4, 2021

(30) Foreign Application Priority Data
Sep. 11, 2018 (JP) ................. 2018-169961

(51) Int. Cl.
| | |
|---|---|
| *C08L 23/08* | (2006.01) |
| *B60C 1/00* | (2006.01) |
| *C08F 210/02* | (2006.01) |
| *C08F 210/16* | (2006.01) |
| *C08F 236/06* | (2006.01) |
| *C08F 236/08* | (2006.01) |

(52) U.S. Cl.
CPC ............ *C08L 23/0815* (2013.01); *B60C 1/00* (2013.01); *B60C 1/0016* (2013.01); *C08F 210/02* (2013.01); *C08F 210/16* (2013.01); *C08F 236/06* (2013.01); *C08F 236/08* (2013.01); *C08L 23/083* (2013.01); *C08L 23/0838* (2013.01); *C08L 2205/02* (2013.01); *C08L 2205/025* (2013.01)

(58) Field of Classification Search
CPC ....... B60C 1/00; B60C 1/0016; C08F 236/06; C08F 236/08; C08F 210/02; C08F 210/16; C08L 23/0815; C08L 23/083; C08L 23/0838; C08L 2205/02; C08L 2205/025
See application file for complete search history.

(56) References Cited

U.S. PATENT DOCUMENTS

| | | |
|---|---|---|
| 6,906,144 B2 | 6/2005 | Jeong et al. |
| 9,074,035 B2 | 7/2015 | Kaita et al. |
| 10,030,092 B2 | 7/2018 | Oishi |
| 10,053,530 B2 | 8/2018 | Oishi et al. |

FOREIGN PATENT DOCUMENTS

| | | |
|---|---|---|
| EP | 2 554 376 A1 | 2/2013 |
| EP | 3 363 829 A1 | 8/2018 |
| EP | 3 363 839 A1 | 8/2018 |
| JP | 05-093110 A | 4/1993 |
| JP | 2005-220313 A | 8/2005 |
| JP | 2008-106166 A | 5/2008 |
| JP | 2017-101181 A | 6/2017 |
| WO | 2012/014455 A1 | 2/2012 |
| WO | 2015/190072 A1 | 12/2015 |
| WO | 2015/190073 A1 | 12/2015 |
| WO | WO 2017/064859 | * 4/2017 |

OTHER PUBLICATIONS

Extended European Search Report dated May 9, 2022 in European Application No. 19859546.4.
International Preliminary Report on Patentability dated Mar. 9, 2021, issued by the International Bureau in application No. PCT/JP2019/030027.
International Search Report for PCT/JP2019/030027 dated Oct. 29, 2019 [PCT/ISA/210].
Written Opinion for PCT/JP2019/030027 dated Oct. 29, 2019 [PCT/ISA/237].

* cited by examiner

*Primary Examiner* — Patrick D Niland
(74) *Attorney, Agent, or Firm* — Sughrue Mion, PLLC

(57) ABSTRACT

Provided is a rubber composition that can achieve excellent breaking resistance while having high operability. A rubber composition comprises: a rubber component containing a multicomponent copolymer that contains a conjugated diene unit, a non-conjugated olefin unit, and an aromatic vinyl unit; and at least one selected from an ethylene-α olefin copolymer and an ethylene-aromatic vinyl copolymer each having a number-average molecular weight of 500 to 30,000.

20 Claims, No Drawings

RUBBER COMPOSITION AND TIRE

CROSS REFERENCE TO RELATED APPLICATIONS

This application is a National Stage of International Application No. PCT/JP2019/030027 filed on Jul. 31, 2019 claiming priority based on Japanese 2018-169961 filed Sep. 11, 2018.

TECHNICAL FIELD

The present disclosure relates to a rubber composition and a tire.

BACKGROUND

Typically, rubber compositions used in production of rubber articles such as tires, conveyor belts, anti-vibration rubbers, and seismic isolation rubbers are required to have durability such as wear resistance and crack growth resistance. To meet this requirement, various rubber components and rubber compositions are developed.

For example, WO 2012/014455 A1 (PTL 1) discloses a copolymer of a conjugated diene compound and a non-conjugated olefin compound wherein the cis-1,4 bond content of a conjugated diene portion (conjugated diene compound-derived portion) is more than 70.5 mol % and the content of non-conjugated olefin is 10 mol % or more. According to PTL 1, this copolymer is used for a rubber having good performance such as crack growth resistance.

However, since the copolymer described in PTL 1 is a bipolymer formed by polymerizing one type of conjugated diene compound and one type of non-conjugated olefin compound, the chain length of a portion consisting of consecutive units derived from the single non-conjugated olefin compound, in particular the chain length of a portion consisting of consecutive units derived from ethylene in the case of using ethylene, is long, and crystallinity increases. Thus, further improvement in durability is needed in some cases.

WO 2015/190072 A1 (PTL 2) discloses a technique of improving durability by containing, in a rubber composition, a multicomponent copolymer containing a conjugated diene unit, a non-conjugated olefin unit, and an aromatic vinyl unit for optimization in structure and property.

CITATION LIST

Patent Literature

PTL 1: WO 2012/014455 A1
PTL 2: WO 2015/190072 A1

SUMMARY

Technical Problem

With the technique described in PTL 2, when the multicomponent copolymer is subjected to significant strain, the multicomponent copolymer can exhibit an energy dissipation effect. By using this rubber composition in a tire, breaking resistance such as wear resistance and crack resistance can be improved.

However, given that the rubber composition obtained by the technique described in PTL 2 contains the multicomponent copolymer, the viscosity of the rubber composition is likely to increase. Hence, further improvement in operability is desired.

It could therefore be helpful to provide a rubber composition that can achieve excellent breaking resistance while having high operability.

It could also be helpful to provide a tire having high operability in production and excellent breaking resistance.

Solution to Problem

We provide the following.

A rubber composition according to the present disclosure comprises: a rubber component containing a multicomponent copolymer that contains a conjugated diene unit, a non-conjugated olefin unit, and an aromatic vinyl unit; and at least one selected from an ethylene-α olefin copolymer and an ethylene-aromatic vinyl copolymer each having a number-average molecular weight of 500 to 30,000.

Such a rubber composition according to the present disclosure can achieve excellent breaking resistance while having high operability.

Preferably, in the rubber composition according to the present disclosure, a content of the at least one selected from the ethylene-α olefin copolymer and the ethylene-aromatic vinyl copolymer is 10 parts to 80 parts by mass with respect to 100 parts by mass of the rubber component. In this case, both the breaking resistance and the operability can be achieved at higher level.

Preferably, in the rubber composition according to the present disclosure, a carbon number of an α-olefin in the ethylene-α olefin copolymer is 3 to 20. In this case, higher operability can be achieved.

Preferably, in the rubber composition according to the present disclosure, a molecular weight distribution of the at least one selected from the ethylene-α olefin copolymer and the ethylene-aromatic vinyl copolymer is in a range of 1 to 5. In this case, both the breaking resistance and the operability can be achieved at higher level.

Preferably, in the rubber composition according to the present disclosure, the rubber composition includes at least the ethylene-α olefin copolymer having a number-average molecular weight of 500 to 30,000, and a content of the ethylene-α olefin copolymer is 10 parts to 80 parts by mass with respect to 100 parts by mass of the rubber component. In this case, both the breaking resistance and the operability can be achieved at higher level.

Preferably, in the rubber composition according to the present disclosure, the rubber composition includes at least the ethylene-aromatic vinyl copolymer having a number-average molecular weight of 500 to 30,000, and a content of the ethylene-aromatic vinyl copolymer is 10 parts to 80 parts by mass with respect to 100 parts by mass of the rubber component. In this case, both the breaking resistance and the operability can be achieved at higher level.

Preferably, in the rubber composition according to the present disclosure, an aromatic vinyl in the ethylene-aromatic vinyl copolymer is styrene. In this case, higher operability can be achieved.

Preferably, in the rubber composition according to the present disclosure, a content of the multicomponent copolymer in the rubber component is 10 mass % or more. In this case, better durability can be achieved, and the elastic modulus after crosslinking and the breaking resistance can be achieved at higher level.

Preferably, in the rubber composition according to the present disclosure, in the multicomponent copolymer, a content of the conjugated diene unit is 1 mol % to 50 mol %, a content of the non-conjugated olefin unit is 40 mol % to 97 mol %, and a content of the aromatic vinyl unit is 2 mol % to 35 mol %. In this case, the breaking resistance can be further improved.

Preferably, in the rubber composition according to the present disclosure, an endothermic peak energy of the multicomponent copolymer from 0° C. to 120° C. measured by a differential scanning calorimeter (DSC) is 10 J/g to 150 J/g. In this case, the operability and the breaking resistance can be further improved.

Preferably, in the rubber composition according to the present disclosure, a melting point of the multicomponent copolymer measured by a differential scanning calorimeter (DSC) is 30° C. to 130° C. In this case, the operability and the breaking resistance can be further improved.

Preferably, in the rubber composition according to the present disclosure, a glass transition temperature of the multicomponent copolymer measured by a differential scanning calorimeter (DSC) is 0° C. or less. In this case, the operability of the rubber composition can be further improved.

Preferably, in the rubber composition according to the present disclosure, a degree of crystallinity of the multicomponent copolymer is 0.5% to 50%. In this case, the operability and the breaking resistance of the rubber composition can be further improved.

Preferably, in the rubber composition according to the present disclosure, a main chain of the multicomponent copolymer consists only of an acyclic structure. In this case, the wear resistance of the rubber composition can be further improved.

Preferably, in the rubber composition according to the present disclosure, in the multicomponent copolymer, the non-conjugated olefin unit consists only of an ethylene unit. In this case, the weather resistance of the rubber composition can be improved.

Preferably, in the rubber composition according to the present disclosure, in the multicomponent copolymer, the aromatic vinyl unit contains a styrene unit. In this case, the weather resistance of the rubber composition can be improved.

Preferably, in the rubber composition according to the present disclosure, in the multicomponent copolymer, the conjugated diene unit contains one or both of a 1,3-butadiene unit and an isoprene unit. In this case, the breaking resistance can be further improved.

A tire according to the present disclosure is produced using the foregoing rubber composition.

Such a tire according to the present disclosure has excellent breaking resistance.

Advantageous Effect

It is therefore possible to provide a rubber composition that can achieve excellent breaking resistance while having high operability.

It is also possible to provide a tire having high operability in production and excellent breaking resistance.

DETAILED DESCRIPTION

A rubber composition and a tire according to the present disclosure will be described in detail below based on embodiments.

<Rubber Composition>

A rubber composition according to the present disclosure comprises: a rubber component (a) containing a multicomponent copolymer (a1) that contains a conjugated diene unit, a non-conjugated olefin unit, and an aromatic vinyl unit; and at least one selected from an ethylene-α olefin copolymer (b1) and an ethylene-aromatic vinyl copolymer (b2) each having a number-average molecular weight of 500 to 30000.

The multicomponent copolymer (a1) contained in the rubber composition according to the present disclosure contains the non-conjugated olefin unit. At large strain, a crystal component derived from the non-conjugated olefin unit disintegrates, and energy can be dissipated by melting energy. Consequently, the rubber composition according to the present disclosure can achieve excellent durability such as breaking resistance. The multicomponent copolymer (a1), however, tends to have high unvulcanized viscosity because it contains a crystal component. There is thus a possibility that sufficient operability cannot be obtained with usual formulation.

The rubber composition according to the present disclosure therefore further contains the ethylene-α olefin copolymer (b1) and/or the ethylene-aromatic vinyl copolymer (b2) as a low number-average molecular weight component highly compatible with the multicomponent copolymer (a1). This can reduce the unvulcanized viscosity, and achieve both the breaking resistance and the operability at high level.

The rubber component (a) in the rubber composition according to the present disclosure contains the multicomponent copolymer (a1) containing a conjugated diene unit, a non-conjugated olefin unit, and an aromatic vinyl unit. The multicomponent copolymer (a1) contains at least a conjugated diene unit, a non-conjugated olefin unit, and an aromatic vinyl unit. The multicomponent copolymer (a1) may consist only of a conjugated diene unit, a non-conjugated olefin unit, and an aromatic vinyl unit, or may further contain one or more other monomer units.

The conjugated diene unit is a structural unit derived from a conjugated diene compound as a monomer. The conjugated diene unit enables vulcanization of the multicomponent copolymer, and also exhibits elongation and strength as rubber. Herein, the "conjugated diene compound" denotes a diene compound of conjugated system. The conjugated diene compound preferably has a carbon number of 4 to 8. Specific examples of the conjugated diene compound include 1,3-butadiene, isoprene, 1,3-pentadiene, and 2,3-dimethyl-1,3-butadiene. These conjugated diene compounds may be used alone or in combination of two or more. The conjugated diene compound as a monomer in the multicomponent copolymer preferably contains 1,3-butadiene and/or isoprene, more preferably consists only of 1,3-butadiene and/or isoprene, and further preferably consists only of 1,3-butadiene, from the viewpoint of effectively improving the durability of the rubber composition, tire, etc. in which the obtained multicomponent copolymer is used. In other words, the conjugated diene unit in the multicomponent copolymer preferably contains a 1,3-butadiene unit and/or an isoprene unit, more preferably consists only of a 1,3-butadiene unit and/or an isoprene unit, and further preferably consists only of a 1,3-butadiene unit.

In the multicomponent copolymer (a1), the content of the conjugated diene unit is preferably 1 mol % or more and more preferably 3 mol % or more, and is preferably 50 mol % or less, more preferably 40 mol % or less, further preferably 30 mol % or less, even more preferably 25 mol % or less, and even further preferably 15 mol % or less. The content of the conjugated diene unit being 1 mol % or more with respect to the whole multicomponent copolymer is preferable because a rubber composition and a rubber article excellent in elongation are obtained. The content of the conjugated diene unit being 50 mol % or less contributes to excellent weather resistance. The content of the conjugated diene unit is preferably in a range of 1 mol % to 50 mol % and more preferably in a range of 3 mol % to 40 mol %, with respect to the whole multicomponent copolymer.

The non-conjugated olefin unit is a structural unit derived from a non-conjugated olefin compound as a monomer. At large strain, a crystal component derived from the non-conjugated olefin unit disintegrates, as a result of which energy is dissipated. Herein, the "non-conjugated olefin compound" denotes a compound that is an unsaturated aliphatic hydrocarbon and has one or more carbon-carbon double bonds. The non-conjugated olefin compound preferably has a carbon number of 2 to 10. Specific examples of the non-conjugated olefin compound include α-olefins such as ethylene, propylene, 1-butene, 1-pentene, 1-hexene, 1-heptene, and 1-octene, and heteroatom-substituted alkene compounds such as vinyl pivalate, 1-phenylthioethane, and N-vinylpyrrolidone. These non-conjugated olefin compounds may be used alone or in combination of two or more. The non-conjugated olefin compound as a monomer in the multicomponent copolymer is preferably an acyclic non-conjugated olefin compound, from the viewpoint of further improving the weather resistance of the rubber composition, tire, etc. in which the obtained multicomponent copolymer is used. The acyclic non-conjugated olefin compound is more preferably α-olefin, further preferably α-olefin containing ethylene, and particularly preferably consists only of ethylene. In other words, the non-conjugated olefin unit in the multicomponent copolymer is preferably an acyclic non-conjugated olefin unit, and the acyclic non-conjugated olefin unit is more preferably an α-olefin unit, further preferably an α-olefin unit containing an ethylene unit, and particularly preferably consists only of an ethylene unit.

In the multicomponent copolymer (a1), the content of the non-conjugated olefin unit is preferably 40 mol % or more, more preferably 45 mol % or more, further preferably 55 mol % or more, and particularly preferably 60 mol % or more, and is preferably 97 mol % or less, more preferably 95 mol % or less, and further preferably 90 mol % or less. If the content of the non-conjugated olefin unit is 40 mol % or more with respect to the whole multicomponent copolymer, the content of the conjugated diene unit or the aromatic vinyl unit decreases, as a result of which the weather resistance is improved and the breaking resistance (especially, breaking strength (Tb)) is improved. If the content of the non-conjugated olefin unit is 97 mol % or less, the content of the conjugated diene unit or the aromatic vinyl unit increases, as a result of which the breaking resistance (especially, breaking elongation (Eb)) at high temperature is improved. The content of the non-conjugated olefin unit is preferably in a range of 40 mol % to 97 mol %, more preferably in a range of 45 mol % to 95 mol %, and further preferably in a range of 55 mol % to 90 mol %, with respect to the whole multicomponent copolymer.

The aromatic vinyl unit is a structural unit derived from an aromatic vinyl compound as a monomer. The aromatic vinyl unit improves the operability of the multicomponent copolymer. Herein, the "aromatic vinyl compound" denotes an aromatic compound substituted with at least a vinyl group, and is not encompassed in the term "conjugated diene compound". The aromatic vinyl compound preferably has a carbon number of 8 to 10. Examples of the aromatic vinyl compound include styrene, o-methylstyrene, m-methyl styrene, p-methyl styrene, o,p-dimethyl styrene, o-ethyl styrene, m-ethylstyrene, and p-ethylstyrene. These aromatic vinyl compounds may be used alone or in combination of two or more. The aromatic vinyl compound as a monomer in the multicomponent copolymer preferably contains styrene, and more preferably consists only of styrene, from the viewpoint of improving the weather resistance of the rubber composition, tire, etc. in which the obtained multicomponent copolymer is used. In other words, the aromatic vinyl unit in the multicomponent copolymer preferably contains a styrene unit, and more preferably consists only of a styrene unit.

The aromatic ring in the aromatic vinyl unit is not included in the main chain of the multicomponent copolymer, unless it binds to an adjacent unit.

In the multicomponent copolymer (a1), the content of the aromatic vinyl unit is preferably 2 mol % or more and more preferably 3 mol % or more, and is preferably 35 mol % or less, more preferably 30 mol % or less, and further preferably 25 mol % or less. If the content of the aromatic vinyl unit is 2 mol % or more, the breaking resistance at high temperature is improved. If the content of the aromatic vinyl unit is 35 mol % or less, the effects by the conjugated diene unit and the non-conjugated olefin unit are prominent. The content of the aromatic vinyl unit is preferably in a range of 2 mol % to 35 mol %, more preferably in a range of 3 mol % to 30 mol %, and further preferably in a range of 3 mol % to 25 mol %, with respect to the whole multicomponent copolymer.

The number of types of monomers in the multicomponent copolymer (a1) is not limited, as long as the multicomponent copolymer contains the conjugated diene unit, the non-conjugated olefin unit, and the aromatic vinyl unit. The multicomponent copolymer (a1) may contain one or more structural units other than the conjugated diene unit, the non-conjugated olefin unit, and the aromatic vinyl unit. From the viewpoint of achieving desired effects, the content of the other structural units is preferably 30 mol % or less, more preferably 20 mol % or less, further preferably 10 mol % or less, and particularly preferably 0 mol % (i.e. the multicomponent copolymer (a1) contains no other structural unit), with respect to the whole multicomponent copolymer.

The multicomponent copolymer (a1) is preferably a polymer formed by performing polymerization at least using only one type of conjugated diene compound, only one type of non-conjugated olefin compound, and one type of aromatic vinyl compound as monomers, from the viewpoint of improving wear resistance, weather resistance, and crystallinity. In other words, the multicomponent copolymer (a1) is preferably a multicomponent copolymer containing only one type of conjugated diene unit, only one type of non-conjugated olefin unit, and only one type of aromatic vinyl unit, more preferably a terpolymer consisting only of only one type of conjugated diene unit, only one type of non-conjugated olefin unit, and only one type of aromatic vinyl unit, and further preferably a terpolymer consisting only of a 1,3-butadiene unit, an ethylene unit, and a styrene unit. Herein, the "only one type of conjugated diene unit" includes conjugated diene units having different binding modes.

In the rubber composition according to the present disclosure, it is preferable that, in the multicomponent copolymer (a1), the content of the conjugated diene unit is 1 mol % to 50 mol %, the content of the non-conjugated olefin unit is 40 mol % to 97 mol %, and the content of the aromatic vinyl unit is 2 mol % to 35 mol %. In this case, the breaking resistance and weather resistance of the rubber composition can be further improved, and the breaking resistance of the tire in which the rubber composition is used can be further improved.

The weight-average molecular weight (Mw) of the multicomponent copolymer (a1) in terms of polystyrene is preferably 10,000 to 10,000,000, more preferably 100,000 to 9,000,000, and further preferably 150,000 to 8,000,000. As a result of the Mw of the multicomponent copolymer being 10,000 or more, sufficient mechanical strength of the rubber composition can be ensured. As a result of the Mw being 10,000,000 or less, high operability can be maintained.

The number-average molecular weight (Mn) of the multicomponent copolymer (a1) in terms of polystyrene is preferably 10,000 to 10,000,000, more preferably 50,000 to 9,000,000, and further preferably 100,000 to 8,000,000. As a result of the Mn of the multicomponent copolymer being 10,000 or more, sufficient mechanical strength of the rubber composition can be ensured. As a result of the Mn being 10,000,000 or less, high operability can be maintained.

The molecular weight distribution [Mw/Mn (weight-average molecular weight/number-average molecular weight)] of the multicomponent copolymer (a1) is preferably 1.00 to 4.00, more preferably 1.50 to 3.50, and further preferably 1.80 to 3.00. As a result of the molecular weight distribution of the multicomponent copolymer being 4.00 or less, sufficient homogeneity can be imparted to the physical properties of the multicomponent copolymer.

The weight-average molecular weight (Mw), the number-average molecular weight (Mn), and the molecular weight distribution (Mw/Mn) described above are measured by gel permeation chromatography (GPC) using polystyrene as a standard substance.

In the rubber composition according to the present disclosure, the endothermic peak energy of the multicomponent copolymer (a1) from 0° C. to 120° C. measured by a differential scanning calorimeter (DSC) is preferably 10 J/g to 150 J/g, and more preferably 30 J/g to 120 J/g. If the endothermic peak energy of the multicomponent copolymer (a1) is 10 J/g or more, the crystallinity of the multicomponent copolymer (a1) is enhanced, the wear resistance of the rubber composition is further improved, and the durability after crosslinking is further improved. If the endothermic peak energy of the multicomponent copolymer (a1) is 150 J/g or less, the operability of the rubber composition is improved.

Herein, the endothermic peak energy is a value measured by a method described in the EXAMPLES section.

In the rubber composition according to the present disclosure, the melting point of the multicomponent copolymer (a1) measured by a differential scanning calorimeter (DSC) is preferably 30° C. to 130° C., and more preferably 30° C. to 110° C. If the melting point of the multicomponent copolymer (a1) is 30° C. or more, the crystallinity of the multicomponent copolymer (a1) is enhanced, the wear resistance of the rubber composition is further improved, and the durability after crosslinking is further improved. If the melting point of the multicomponent copolymer (a1) is 130° C. or less, the operability of the rubber composition is further improved.

Herein, the melting point is a value measured by a method described in the EXAMPLES section.

In the rubber composition according to the present disclosure, the glass transition temperature (Tg) of the multicomponent copolymer (a1) measured by a differential scanning calorimeter (DSC) is preferably 0° C. or less, and more preferably −100° C. to −10° C. If the glass transition temperature of the multicomponent copolymer (a1) is 0° C. or less, the operability of the rubber composition is improved.

Herein, the glass transition temperature is a value measured by a method described in the EXAMPLES section.

In the rubber composition according to the present disclosure, the degree of crystallinity of the multicomponent copolymer (a1) is preferably 0.5% to 50%, more preferably 3% to 45%, and further preferably 5% to 45%. If the degree of crystallinity of the multicomponent copolymer (a1) is 0.5% or more, sufficient crystallinity attributable to the non-conjugated olefin unit is ensured, and the breaking resistance is further improved. If the degree of crystallinity of the multicomponent copolymer (a1) is 50% or less, the operability during kneading of the rubber composition is improved, and the tackiness of the rubber composition containing the multicomponent copolymer (a1) is improved. Consequently, the operability when attaching rubber members produced from the rubber composition to each other to form a rubber article such as a tire is improved.

Herein, the degree of crystallinity is a value measured by a method described in the EXAMPLES section.

In the rubber composition according to the present disclosure, the multicomponent copolymer (a1) preferably has a main chain consisting only of an acyclic structure. This further improves the wear resistance of the rubber composition, and further improves the durability after crosslinking. NMR is used as a principal measurement means for determining whether the main chain of the multicomponent copolymer (a1) has a cyclic structure. Specifically, in the case where a peak derived from a cyclic structure existing in the main chain (for example, a peak appearing at 10 ppm to 24 ppm in the case of three- to five-membered rings) is not observed, it is determined that the main chain of the multicomponent copolymer consists only of an acyclic structure.

The multicomponent copolymer (a1) can be produced through a polymerization step using the conjugated diene compound, the non-conjugated olefin compound, and the aromatic vinyl compound as monomers. Further, other steps such as a coupling step and a cleaning step may be optionally performed.

In the production of the multicomponent copolymer (a1), it is preferable to add only the non-conjugated olefin compound and the aromatic vinyl compound in the presence of a polymerization catalyst without adding the conjugated diene compound, and polymerize them. Particularly in the case of using the below-described catalyst composition, it is likely to be difficult to polymerize the non-conjugated olefin compound and/or the aromatic vinyl compound in the presence of the conjugated diene compound, because the conjugated diene compound has higher reactivity than the non-conjugated olefin compound and the aromatic vinyl compound. It is also likely to be difficult to polymerize the conjugated diene compound first and then additionally polymerize the non-conjugated olefin compound and the aromatic vinyl compound, given the properties of the catalyst.

The polymerization method may be any method such as solution polymerization, suspension polymerization, liquid phase bulk polymerization, emulsion polymerization, gas phase polymerization, or solid phase polymerization. In the case of using a solvent in the polymerization reaction, any solvent that is inactive in the polymerization reaction can be used. Examples include toluene, cyclohexane, and normal hexane.

The polymerization step may be performed in one stage, or in multiple (i.e. two or more) stages. The polymerization step in one stage is a step of causing simultaneous reaction of all types of monomers to be polymerized, i.e. the conjugated diene compound, the non-conjugated olefin compound, the aromatic vinyl compound, and other monomers, and preferably the conjugated diene compound, the non-conjugated olefin compound, and the aromatic vinyl compound, to polymerize them. The polymerization step in multiple stages is a step of first causing reaction of the whole or part of one or two types of monomers to form a polymer (first polymerization stage) and then performing one or more stages (second to last polymerization stages) in which the remaining types of monomers and/or the balance of the one or two types of monomers is added to polymerize them. In particular, the polymerization step in the production of the multicomponent copolymer is preferably performed in multiple stages.

In the polymerization step, the polymerization reaction is preferably performed in an atmosphere of inert gas, preferably nitrogen gas or argon gas. The polymerization temperature in the polymerization reaction is not limited, but is preferably in a range of −100° C. to 200° C. as an example, and may be approximately room temperature. The pressure in the polymerization reaction is preferably in a range of 0.1 MPa to 10.0 MPa, in order to sufficiently incorporate the conjugated diene compound into the polymerization reaction system. The reaction time in the polymerization reaction is not limited, and may be selected as appropriate depending on conditions such as the polymerization catalyst type and the polymerization temperature. For example, the reaction time is preferably in a range of 1 sec to 10 days.

In the polymerization step of the conjugated diene compound, polymerization may be terminated using a terminator such as methanol, ethanol, or isopropanol.

The polymerization step is preferably performed in multiple stages. It is more preferable to perform a first step of mixing a first monomer material containing at least the aromatic vinyl compound and a polymerization catalyst to obtain a polymerization mixture, and a second step of introducing, into the polymerization mixture, a second monomer material containing at least one selected from the group consisting of the conjugated diene compound, the non-conjugated olefin compound, and the aromatic vinyl compound. Further preferably, the first monomer material does not contain the conjugated diene compound and the second monomer material contains the conjugated diene compound.

The first monomer material used in the first step may contain the non-conjugated olefin compound in addition to the aromatic vinyl compound. The first monomer material may contain the whole or part of the aromatic vinyl compound used. The non-conjugated olefin compound is contained in at least one of the first monomer material and the second monomer material.

The first step is preferably performed in an atmosphere of inert gas, preferably nitrogen gas or argon gas, in a reactor. The temperature (reaction temperature) in the first step is not limited, but is preferably in a range of −100° C. to 200° C. as an example, and may be approximately room temperature. The pressure in the first step is not limited, but is preferably in a range of 0.1 MPa to 10.0 MPa in order to sufficiently incorporate the aromatic vinyl compound into the polymerization reaction system. The time (reaction time) in the first step may be selected as appropriate depending on conditions such as the polymerization catalyst type and the reaction temperature. For example, in the case where the reaction temperature is 25° C. to 80° C., the reaction time is preferably in a range of 5 min to 500 min.

The polymerization method for obtaining the polymerization mixture in the first step may be any method such as solution polymerization, suspension polymerization, liquid phase bulk polymerization, emulsion polymerization, gas phase polymerization, or solid phase polymerization. In the case of using a solvent in the polymerization reaction, any solvent that is inactive in the polymerization reaction can be used. Examples include toluene, cyclohexane, and normal hexane.

The second monomer material used in the second step is preferably composed of: the conjugated diene compound alone; the conjugated diene compound and the non-conjugated olefin compound; the conjugated diene compound and the aromatic vinyl compound; or the conjugated diene compound, the non-conjugated olefin compound, and the aromatic vinyl compound.

In the case where the second monomer material contains at least one selected from the group consisting of the non-conjugated olefin compound and the aromatic vinyl compound besides the conjugated diene compound, these monomer materials may be mixed together with a solvent or the like beforehand, and then introduced into the polymerization mixture. Alternatively, each monomer material may be introduced in an individual state. The monomer materials may be added simultaneously or sequentially. The method of introducing the second monomer material into the polymerization mixture in the second step is not limited, but preferably each monomer material is continuously added to the polymerization mixture while controlling the flow rate (i.e. metering). In the case of using such a monomer material (e.g. ethylene as the non-conjugated olefin compound under the conditions of room temperature and ordinary pressure) that is gas under the conditions of the polymerization reaction system, the monomer material can be introduced into the polymerization reaction system at predetermined pressure.

The second step is preferably performed in an atmosphere of inert gas, preferably nitrogen gas or argon gas. The temperature (reaction temperature) in the second step is not limited, but is preferably in a range of −100° C. to 200° C. as an example, and may be approximately room temperature. When the reaction temperature is increased, the selectivity of cis-1,4 bond in the conjugated diene unit may decrease. The pressure in the second step is not limited, but is preferably in a range of 0.1 MPa to 10.0 MPa in order to sufficiently incorporate the monomer(s) such as the conjugated diene compound into the polymerization reaction system. The time (reaction time) in the second step may be selected as appropriate depending on conditions such as the polymerization catalyst type and the reaction temperature. For example, the reaction time is preferably in a range of 0.1 hr to 10 days.

In the second step, the polymerization reaction may be terminated using a terminator such as methanol, ethanol, or isopropanol.

The polymerization step for the conjugated diene compound, the non-conjugated olefin compound, and the aromatic vinyl compound preferably includes a step of polymerizing the monomers in the presence of one or more of the following components (A) to (F) as a catalyst component. In the polymerization step, it is preferable to use one or more of the following components (A) to (F) and more preferable to use two or more of the following components (A) to (F) in combination as a catalyst composition.

Component (A): a rare-earth element compound or a reaction product of the rare-earth element compound and a Lewis base.

Component (B): an organic metal compound.
Component (C): an aluminoxane.
Component (D): an ionic compound.
Component (E): a halogen compound.
Component (F): a cyclopentadiene skeleton-containing compound selected from a substituted or unsubstituted cyclopentadiene (a compound having a cyclopentadienyl group), a substituted or unsubstituted indene (a compound having an indenyl group), and a substituted or unsubstituted fluorine (a compound having a fluorenyl group).

The components (A) to (F) can be used in the polymerization step, with reference to WO 2018/092733 A1 as an example.

The coupling step is a step of performing reaction (coupling reaction) to modify at least part (for example, a terminal end) of a polymer chain of the multicomponent copolymer obtained in the polymerization step.

In the coupling step, the coupling reaction is preferably performed when the polymerization reaction has reached 100%.

The coupling agent used in the coupling reaction is not limited, and may be selected as appropriate depending on the intended use. Examples include: tin-containing compounds such as bis(maleic acid-1-octadecyl)dioctyltin (IV); isocyanate compounds such as 4,4'-diphenylmethane diisocyanate; and alkoxysilane compounds such as glycidylpropyltrimethoxysilane. These coupling agents may be used alone or in combination of two or more.

Of these, bis(maleic acid-1-octadecyl)dioctyltin (IV) is preferable from the viewpoint of reaction efficiency and low gel formation.

The coupling reaction thus performed can increase the number-average molecular weight (Mn).

The cleaning step is a step of cleaning the multicomponent copolymer obtained in the polymerization step. The medium used in the cleaning is not limited, and may be selected as appropriate depending on the intended use. Examples include methanol, ethanol, and isopropanol. An acid (such as hydrochloric acid, sulfuric acid, nitric acid) may be added to these solvents, when using a Lewis acid-derived catalyst as the polymerization catalyst. The amount of the acid added is preferably 15 mol % or less with respect to the solvent. If the amount of the acid is more than 15 mol %, the acid remains in the multicomponent copolymer, which may adversely affect the reaction during kneading and vulcanization.

The cleaning step can favorably reduce the catalyst residue in the multicomponent copolymer.

In the rubber composition according to the present disclosure, the content of the multicomponent copolymer (a1) in the rubber component (a) is not limited, but is preferably 10 mass % or more, and more preferably 30 mass % or more. If the content of the multicomponent copolymer (a1) in the rubber component (a) is 10 mass % or more, the effect by the multicomponent copolymer (a1) is sufficiently exerted, and the wear resistance of the rubber composition is further improved. Moreover, in the case where the rubber composition contains silica as a filler (c), the silica can be prevented from being localized in the phases of other polymer components, as a result of which the elastic modulus and breaking resistance of the rubber composition after crosslinking can be further improved.

The rubber component (a) may contain one or more rubber components other than the multicomponent copolymer (a1). The one or more rubber components other than the multicomponent copolymer (a1) are not limited, and may be selected as appropriate depending on the intended use. Examples include natural rubber (NR), isoprene rubber (IR), butadiene rubber (BR), acrylonitrile-butadiene rubber (NBR), chloroprene rubber, ethylene-propylene rubber (EPM), ethylene-propylene-diene rubber (EPDM), polysulfide rubber, silicone rubber, fluororubber, and urethane rubber, which may be used alone or in combination of two or more.

The rubber composition according to the present disclosure contains at least one selected from the ethylene-α olefin copolymer (b1) and the ethylene-aromatic vinyl copolymer (b2) each having a number-average molecular weight (Mn) of 500 to 30,000, in addition to the above-described rubber component (a).

As a result of the rubber composition containing the ethylene-α olefin copolymer (b1) and/or the ethylene-aromatic vinyl copolymer (b2) having a low number-average molecular weight (Mn: 500 to 30,000), the multicomponent copolymer (a1) can be softened, and the unvulcanized viscosity of the rubber composition can be reduced. Consequently, the operability of the rubber composition can be improved even though it contains the multicomponent copolymer (a1).

The reason for limiting the number-average molecular weight of the ethylene-α olefin copolymer (b1) and the ethylene-aromatic vinyl copolymer (b2) to a range of 500 to 30,000 is as follows: As a result of the number-average molecular weight being 30,000 or less, the unvulcanized viscosity of the rubber composition can be reduced. As a result of the number-average molecular weight being 500 or more, the compatibility with the multicomponent copolymer (a1) can be ensured.

For the same reason, the number-average molecular weight (Mn) of the ethylene-α olefin copolymer (b1) and the ethylene-aromatic vinyl copolymer (b2) is preferably 500 to 25,000, and more preferably 500 to 10,000.

The number-average molecular weight (Mn) described above is measured by gel permeation chromatography (GPC) using polystyrene as a standard substance.

The molecular weight distribution (Mw/Mn) of the at least one selected from the ethylene-α olefin copolymer (b1) and the ethylene-aromatic vinyl copolymer (b2) is preferably in a range of 1 to 5. As a result of the molecular weight distribution being wide, the low number-average molecular weight component increases even with the same number-average molecular weight, so that the breaking resistance and the operability can be achieved at higher level.

The weight-average molecular weight (Mw), number-average molecular weight (Mn), and molecular weight distribution (Mw/Mn) of the ethylene-α olefin copolymer (b1) and the ethylene-aromatic vinyl copolymer (b2) are measured by gel permeation chromatography (GPC) using polystyrene as a standard substance.

The ethylene-α olefin copolymer is not limited as long as its number-average molecular weight is 500 to 30,000, and a publicly-known ethylene-α olefin copolymer may be selected and used as appropriate.

The carbon number of α-olefin in the ethylene-α olefin copolymer is preferably 3 to 20, more preferably 3 to 18, and further preferably 3 to 10. As a result of the carbon number of the α-olefin being 20 or less, a copolymer having a low number-average molecular weight and high compatibility with the multicomponent copolymer (a1) can be obtained, so that the operability can be further improved.

Examples of the α olefin having a carbon number of 3 to 20 include propylene, 1-butene, 4-methyl-1-pentene, 1-hexene, 1-octene, and 1-decene. Examples of the ethylene-α olefin copolymer using the α olefin having a carbon number of 3 to 20 include an ethylene-propylene copolymer, an ethylene-1-butene copolymer, an ethylene-1-hexene copolymer, an ethylene-4-methyl-1-pentene copolymer, an ethylene-1-octene copolymer, an ethylene-1-butene-1-hexene copolymer, an ethylene-1-butene-4-methyl-1-pentene copolymer, and an ethylene-1-butene-1-octene copolymer.

The content ratio between ethylene and α olefin in the ethylene-α olefin copolymer in molar ratio is preferably ethylene/α olefin=5 to 95/95 to 5, more preferably ethylene/α olefin=15 to 95/85 to 5, further preferably ethylene/α olefin=30 to 95/70 to 5, and particularly preferably ethylene/a olefin=45 to 95/55 to 5. With this content ratio, the unvulcanized viscosity of the rubber composition according to the present disclosure can be reduced to achieve higher operability.

The rubber composition according to the present disclosure contains at least the ethylene-α olefin copolymer as a copolymer having a number-average molecular weight of 500 to 30000, and the content of the ethylene-α olefin copolymer is preferably 10 to 80 parts by mass, more preferably 30 to 80 parts by mass, and further preferably 35 to 60 parts by mass, with respect to 100 parts by mass of the rubber component. As a result of the content of the ethylene-α olefin copolymer being 10 parts by mass or more with respect to 100 parts by mass of the rubber component, the unvulcanized viscosity can be reduced to achieve higher operability. As a result of the content of the ethylene-α olefin copolymer being 80 parts by mass or less with respect to 100 parts by mass of the rubber component, degradation in breaking resistance and other properties can be suppressed.

The ethylene-aromatic vinyl copolymer is not limited as long as its number-average molecular weight is 500 to 30,000, and a publicly-known ethylene-aromatic vinyl copolymer may be selected and used as appropriate.

Aromatic vinyl in the ethylene-aromatic vinyl copolymer is not limited, and examples include styrene, o-methylstyrene, m-methylstyrene, p-methylstyrene, o,p-dimethylstyrene, o-ethylstyrene, m-ethylstyrene, and p-ethylstyrene. Of these, styrene is preferably used as the aromatic vinyl from the viewpoint of achieving higher operability.

The content ratio between ethylene and aromatic vinyl in the ethylene-aromatic vinyl copolymer in molar ratio is preferably ethylene/aromatic vinyl=5 to 95/95 to 5, more preferably ethylene/aromatic vinyl=15 to 95/85 to 5, further preferably ethylene/aromatic vinyl=30 to 95/70 to 5, and particularly preferably ethylene/aromatic vinyl=45 to 95/55 to 5. With this content ratio, the unvulcanized viscosity of the rubber composition according to the present disclosure can be reduced to achieve higher operability.

The rubber composition according to the present disclosure contains at least the ethylene-aromatic vinyl copolymer as a copolymer having a number-average molecular weight of 500 to 30000, and the content of the ethylene-aromatic vinyl copolymer is preferably 10 to 80 parts by mass, more preferably 30 to 80 parts by mass, and further preferably 35 to 60 parts by mass, with respect to 100 parts by mass of the rubber component. As a result of the content of the ethylene-aromatic vinyl copolymer being 10 parts by mass or more with respect to 100 parts by mass of the rubber component, the unvulcanized viscosity can be reduced to achieve higher operability. As a result of the content of the ethylene-aromatic vinyl copolymer being 80 parts by mass or less with respect to 100 parts by mass of the rubber component, degradation in breaking resistance and other properties can be suppressed.

The rubber composition according to the present disclosure contains at least one selected from the ethylene-α olefin copolymer and the ethylene-aromatic vinyl copolymer. Here, regardless of whether the rubber composition contains both the ethylene-α olefin copolymer and the ethylene-aromatic vinyl copolymer or only one of the ethylene-α olefin copolymer and the ethylene-aromatic vinyl copolymer, the content is preferably 10 parts to 80 parts by mass, more preferably 30 parts to 80 parts by mass, and further preferably 35 parts to 60 parts by mass, with respect to 100 parts by mass of the rubber component. As a result of the content being 10 parts by mass or more with respect to 100 parts by mass of the rubber component, the unvulcanized viscosity can be reduced to achieve higher operability. As a result of the content being 80 parts by mass or less with respect to 100 parts by mass of the rubber component, degradation in breaking resistance and other properties can be suppressed.

The rubber composition according to the present disclosure preferably contains the filler (c). If the rubber composition contains the filler (c), the reinforcing property of the rubber composition can be improved. Examples of the filler (c) include, without being limited thereto, carbon black, silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. Of these, carbon black, silica, and aluminum hydroxide are preferable, and carbon black and silica are more preferable. These fillers may be used alone or in combination of two or more.

Examples of the carbon black include, without being limited thereto, GPF, FEF, HAF, ISAF, and SAF grade carbon blacks.

Examples of the silica include wet silica (hydrous silicate), dry silica (anhydrous silicate), calcium silicate, and aluminum silicate. Of these, wet silica is preferable.

As the aluminum hydroxide, Higilite® (produced by Showa Denko K. K.) (Higilite is a registered trademark in Japan, other countries, or both) is preferably used.

The content of the filler (c) is not limited, and may be selected as appropriate depending on the intended use. The content of the filler (c) is preferably 10 parts to 120 parts by mass, more preferably 20 parts to 100 parts by mass, and particularly preferably 30 parts to 80 parts by mass, with respect to 100 parts by mass of the rubber component (a). As a result of the content of the filler being 10 parts by mass or more, the reinforcing property improving effect of the filler can be sufficiently achieved. As a result of the content of the filler being 120 parts by mass or less, favorable operability can be maintained.

The rubber composition according to the present disclosure preferably contains a crosslinking agent (d) in the case where crosslinking is performed.

The crosslinking agent (d) is not limited, and may be selected as appropriate depending on the intended use. Examples include a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent, with the sulfur-based crosslinking agent (vulcanizing agent) being more preferred for the rubber composition for use in tires.

The content the crosslinking agent (d) is not limited, and may be selected as appropriate depending on the intended use. The content of the crosslinking agent is preferably 0.1 parts to 20 parts by mass with respect to 100 parts by mass of the rubber component (a).

In the case of using the vulcanizing agent as the crosslinking agent (d), a vulcanization accelerator may be additionally used in combination.

Examples of the vulcanization accelerator include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, and a xanthate-based compound.

The rubber composition according to the present disclosure preferably contains a resin component (e). As a result of the rubber composition containing the resin component (e), the operability of the rubber composition is further improved. As a result of the rubber composition containing the resin component (e) together with the multicomponent copolymer (a1), high wear resistance attributable to the multicomponent copolymer (a1) is maintained, and also the rubber composition has excellent tackiness when adhered to other members during formation of a tire or the like. This improves the productivity of the tire or the like.

As the resin component (e), various natural resins and synthetic resins may be used. Specifically, rosin-based resins, terpene-based resins, petroleum-based resins, phenol-based resins, coal-based resins, xylene-based resins, etc. are preferable. These resin components (e) may be used alone or in combination of two or more.

In the natural resins, examples of the rosin-based resins include gum rosin, tall oil rosin, wood rosin, hydrogenated rosin, disproportionated rosin, polymerized rosin, modified rosin glycerin, and pentaerythritol ester.

In the natural resins, examples of the terpene-based resins include terpene resins such as α-pinene-based, β-pinene-based, and dipentene-based, aromatic modified terpene resin, terpenephenol resin, and hydrogenated terpene resin.

Of these natural resins, polymerized rosin, terpene phenol resin, and hydrogenated terpene resin are preferable from the viewpoint of the wear resistance of the formulated rubber composition.

In the synthetic resins, the petroleum-based resins are obtained by polymerizing, using a Friedel-Crafts catalyst, a cracked distillate fraction in a mixture state containing unsaturated hydrocarbon such as olefin or diolefin produced as a by-product together with a petrochemical basic raw material such as ethylene or propylene by, for example, pyrolysis of naphtha in the petrochemical industry. Examples of the petroleum-based resins include an aliphatic petroleum resin (hereafter also referred to as "$C_5$-based resin") obtained by (co)polymerizing a $C_5$ fraction obtained by pyrolysis of naphtha, an aromatic petroleum resin (hereafter also referred to as "$C_9$-based resin") obtained by (co)polymerizing a $C_9$ fraction obtained by pyrolysis of naphtha, a copolymer petroleum resin (hereafter also referred to as "$C_5$-$C_9$-based resin") obtained by copolymerizing the $C_5$ fraction and the $C_9$ fraction, a cycloaliphatic compound-based petroleum resin such as hydrogenated or dicyclopentadiene-based, and a styrene-based resin such as styrene, substituted styrene, or a copolymer of styrene and another monomer.

The $C_5$ fraction obtained by pyrolysis of naphtha typically includes an olefinic hydrocarbon such as 1-pentene, 2-pentene, 2-methyl-1-butene, 2-methyl-2-butene, or 3-methyl-1-butene, a diolefinic hydrocarbon such as 2-methyl-1,3-butadiene, 1,2-pentadiene, 1,3-pentadiene, or 3-methyl-1,2-butadiene, or the like. The aromatic petroleum resin obtained (co)polymerizing the $C_9$ fraction is a resin obtained by polymerization of an aromatic compound having a carbon number of 9 such as vinyltoluene, indene, etc as main monomers. Specific examples of the $C_9$ fraction obtained by pyrolysis of naphtha include styrene homologs such as α-methylstyrene, β-methylstyrene, and γ-methylstyrene, and indene homologs such as indene and coumarone. Examples of product names include PETROSIN produced by Mitsui Petrochemical Industries, Ltd., PETLITE produced by Mikuni Chemical Industry Co., Ltd., NEO POLYMER produced by Nippon Petrochemicals Co., Ltd., and PETCOL produced by Tosoh Corporation.

Furthermore, in the present disclosure, a modified petroleum resin obtained by modification of the petroleum resin containing the $C_9$ fraction is preferably used. Examples of the modified petroleum resin include a $C_9$-based petroleum resin modified by an unsaturated cycloaliphatic compound, a $C_9$-based petroleum resin modified by a compound having a hydroxyl group, and a $C_9$-based petroleum resin modified by an unsaturated carboxylic acid compound.

Preferable examples of the unsaturated cycloaliphatic compound include cyclopentadiene and methylcyclopentadiene. As the unsaturated cycloaliphatic compound, a Diels-Alder reaction product of alkylcyclopentadiene is also preferable. Examples of the Diels-Alder reaction product of alkylcyclopentadiene include dicyclopentadiene, cyclopentadiene/methylcyclopentadiene codimers, and tricyclopentadiene. As the unsaturated cycloaliphatic compound, dicyclopentadiene is particularly preferable. The dicyclopentadiene-modified $C_9$-based petroleum resin can be obtained by thermal polymerization or the like in the presence of both of dicyclopentadiene and the $C_9$ fraction. The dicyclopentadiene-modified $C_9$-based petroleum resin is, for example, NEO POLYMER 130S (produced by Nippon Petrochemicals Co., Ltd.).

Examples of the compound having a hydroxyl group include an alcohol compound and a phenol compound. Specific examples of the alcohol compound include alcohol compounds having a double bond such as aryl alcohol and 2-butene-1,4-diol. Examples of the phenol compound include alkylphenols such as phenol, cresol, xylenol, p-tert-butylphenol, p-octylphenol, and p-nonylphenol. These compounds having a hydroxyl group may be used alone or in combination of two or more. The $C_9$-based petroleum resin having a hydroxyl group can be produced by, for example, a method of thermally polarizing a (meth)acrylic acid alkyl ester or the like together with a petroleum fraction to introduce an ester group into petroleum resin and then reducing the ester group, or a method of causing a double bond to remain in petroleum resin or introducing the double bond into the petroleum resin and then hydrating the double bond. Although the $C_9$-based petroleum resin having a hydroxyl group can be obtained by various methods as mentioned above, it is preferable to use a phenol-modified petroleum resin or the like from the viewpoint of performance and production. The phenol-modified petroleum resin is obtained by cationic polymerization of the $C_9$ fraction in the presence of phenol, is easy to modify, and is inexpensive. The phenol-modified $C_9$-based petroleum resin is, for example, NEO POLYMER E-130 (produced by Nippon Petrochemicals Co., Ltd.).

The $C_9$-based petroleum resin modified by an unsaturated carboxylic acid compound may be a $C_9$-based petroleum resin modified by an ethylenic unsaturated carboxylic acid. Typical examples of the ethylenic unsaturated carboxylic acid include (anhydrous) maleic acid, fumaric acid, itaconic acid, tetrahydro (anhydrous) phthalic acid, (meth)acrylic acid, and citraconic acid. The unsaturated carboxylic acid-modified $C_9$-based petroleum resin can be obtained by thermally polymerizing the $C_9$-based petroleum resin and the ethylene-based unsaturated carboxylic acid. In the present disclosure, a maleic acid-modified $C_9$-based petroleum resin is preferable. The unsaturated carboxylic acid-modified $C_9$-based petroleum resin is, for example, NEO POLYMER 160 (produced by Nippon Petrochemicals Co., Ltd.).

In the present disclosure, a copolymer resin of the $C_5$ fraction and the $C_9$ fraction obtained by pyrolysis of naphtha may be preferably used. The $C_9$ fraction is not limited, but is preferably a $C_9$ fraction obtained by pyrolysis of naphtha. Specific examples include TS30, TS30-DL, TS35, and TS35-DL of the STRUKTOL series produced by Schill & Seilacher GmbH.

In the synthetic resins, examples of the phenol-based resins include an alkylphenol formaldehyde-based resin and a rosin-modified derivative thereof, an alkylphenol acetylene-based resin, a modified alkylphenol resin, and a terpe-nephenol resin. Specific examples include HITANOL 1502 (produced by Hitachi Chemical Industry Co., Ltd.) which is a novolac type alkylphenol resin, and KORESIN (produced by BASF A. G.) which is a p-tert-butylphenol acetylene resin.

In the synthetic resins, an example of the coal-based resins is a coumarone indene resin. In the synthetic resins, an example of the xylene-based resins is a xylene formaldehyde resin. Polybutene is also usable as a resin component. Of these synthetic resins, a copolymer resin of the $C_5$ fraction and the $C_9$ fraction, an aromatic petroleum resin obtained by (co)polymerizing the $C_9$ fraction, a phenol-based resin, and a coumarone indene resin are preferable, from the viewpoint of the wear resistance of the formulated rubber composition.

The SP value of the resin component (e) is preferably 4 $(MPa)^{1/2}$ or less, and more preferably 3 $(MPa)^{1/2}$ or less. If the SP value of the resin component (e) is 4 $(MPa)^{1/2}$ or less, the resin component (e) is prevented from existing locally and forming fracture nuclei in the rubber composition, so that the wear resistance of the rubber composition is further improved. No lower limit is placed on the SP value of the resin component (e), but the SP value of the resin component (e) is preferably 0.01 $(MPa)^{1/2}$ or more.

Herein, the SP value of the resin component (e) refers to a solubility parameter calculated using Hansen's formula. More specifically, the SP value of the resin component (e) refers to a value calculated from dipole interaction energy between molecules and energy by hydrogen bond from among three parameters of Hansen.

The weight-average molecular weight (Mw) of the resin component (e) is preferably 2000 or less, and more preferably 1500 or less. If the weight-average molecular weight (Mw) of the resin component (e) is 2000 or less, the resin component (e) is prevented from existing locally and forming fracture nuclei in the rubber composition, so that the wear resistance of the rubber composition is further improved. No lower limit is placed on the weight-average molecular weight (Mw) of the resin component (e), but the weight-average molecular weight (Mw) of the resin component (e) is preferably 400 or more.

Herein, the weight-average molecular weight (Mw) of the resin component (e) is a value measured using gel permeation chromatography (GPC) in terms of polystyrene.

The softening point of the resin component (e) (measurement method: ASTM E28-58-T) is preferably 200° C. or less, more preferably in a range of 80° C. to 150° C., and further preferably in a range of 90° C. to 120° C. If the softening point is 200° C. or less, the temperature dependence of the hysteresis loss property is low, and the operability is further improved.

The content of the resin component (e) is preferably 5 parts to 150 parts by mass, more preferably 5 parts to 100 parts by mass, further preferably 10 parts to 80 parts by mass, and particularly preferably 10 parts to 50 parts by mass, with respect to 100 parts by mass of the rubber component (a). If the content of the resin component (e) is 5 parts by mass or more with respect to 100 parts by mass of the rubber component (a), the tackiness and wear resistance of the rubber composition are further improved. If the content of the resin component (e) is 150 parts by mass or less with respect to 100 parts by mass of the rubber component (a), favorable operability of the rubber composition can be maintained.

The rubber composition according to the present disclosure preferably contains a softener (f). As a result of the rubber composition containing the softener (f), the operability of the rubber composition is further improved.

Examples of the softener (f) include mineral-derived oil, petroleum-derived aromatic oil, paraffin oil, naphthene oil, and palm oil derived from natural products. Of these, a mineral-derived softener and a petroleum-derived softener are preferable from the viewpoint of the wear resistance of the rubber composition.

As the softener, a mixture of naphthene oil and asphalt or paraffin oil is particularly preferable.

In the mixture of naphthene oil and asphalt, the naphthene oil may be hydrogenated naphthene oil. The hydrogenated naphthene oil can be obtained by hydrorefining naphthene oil by a high-temperature high-pressure hydrorefining technique beforehand. The asphalt preferably has an asphaltene component of 5 mass % or less, from the viewpoint of the compatibility with the rubber component (a) and the effect as a softener. The asphaltene component is quantified by composition analysis through measurement in accordance with the JPI (Japan Petroleum Institute) method.

The SP value of the softener (f) is preferably 4 $(MPa)^{1/2}$ or less, and more preferably 3 $(MPa)^{1/2}$ or less. If the SP value of the softener (f) is 4 $(MPa)^{1/2}$ or less, the softener (f) is prevented from existing locally and forming fracture nuclei in the rubber composition, so that the wear resistance of the rubber composition is further improved and the breaking resistance of the rubber composition is also improved. No lower limit is placed on the SP value of the softener (f), but the SP value of the softener (f) is preferably 0.01 $(MPa)^{1/2}$ or more.

Herein, the SP value of the softener (f) refers to a solubility parameter calculated using Hansen's formula. More specifically, the SP value of the softener (f) refers to a value calculated from dipole interaction energy between molecules and energy by hydrogen bond from among three parameters of Hansen.

The weight-average molecular weight (Mw) of the softener (f) is preferably 2000 or less, and more preferably 1500 or less. If the weight-average molecular weight (Mw) of the softener (f) is 2000 or less, the softener (f) is prevented from existing locally and forming fracture nuclei in the rubber composition, so that the wear resistance of the rubber composition is further improved. No lower limit is placed on the weight-average molecular weight (Mw) of the softener (f), but the weight-average molecular weight (Mw) of the softener (f) is preferably 400 or more.

Herein, the weight-average molecular weight (Mw) of the softener (f) is a value measured using gel permeation chromatography (GPC) in terms of polystyrene.

The content of the softener (f) is preferably 0.1 parts to 150 parts by mass, more preferably 1 parts to 130 parts by mass, and further preferably 5 parts to 110 parts by mass, with respect to 100 parts by mass of the rubber component (a). If the content of the softener (f) is 0.1 parts by mass or more with respect to 100 parts by mass of the rubber component (a), the operability of the rubber composition is further improved. If the content of the softener (f) is 150 parts by mass or less with respect to 100 parts by mass of the rubber component (a), the wear resistance of the rubber composition is further improved.

The rubber composition according to the present disclosure preferably contains a silane coupling agent (g), in the case where the rubber composition contains the silica as the filler (c).

The silane coupling agent (g) is not limited, and examples include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N, N-dimethylthiocarbamoyl tetrasulfide, 2-tri ethoxy silylethyl-N,N-dimethylthiocarbamoyl tetrasulfide, 3-trimethoxysilylpropylbenzothiazolyltetrasulfide, 3-triethoxysilylpropylbenzothiazolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazolyl tetrasulfide. These silane coupling agents may be used alone or in combination of two or more.

The content of the silane coupling agent (g) is preferably 3 parts to 15 mass % and more preferably 5 parts to 15 parts by mass, with respect to the content of the silica (where the content of the silica is 100%). If the content of the silane coupling agent is 3 parts by mass or more with respect to 100 parts by mass of the silica, the high elastic modulus and breaking resistance improving effect of the silica are sufficiently achieved. If the content of the silane coupling agent is 15 parts by mass or less with respect to 100 parts by mass of the silica, gelation of the rubber component (a) is reliably suppressed.

The rubber composition according to the present disclosure may optionally contain, depending on the intended use, a vulcanization aid, a colorant, a flame retarder, a lubricant, an age resistor, an antiscorching agent, an anti-ultraviolet agent, an antistatic agent, a coloration inhibitor, and other publicly-known additives.

<Tire>

A tire according to the present disclosure is produced using the foregoing rubber composition according to the present disclosure. Since the tire according to the present disclosure is produced using the rubber composition according to the present disclosure as a tire material, the tire has high operability in production and excellent breaking resistance.

The part in which the rubber composition according to the present disclosure is used is not limited, but is preferably the tread. The tire having the rubber composition according to the present disclosure used in its tread has high operability in production and excellent breaking resistance.

The tire according to the present disclosure is not limited as long as the rubber composition according to the present disclosure is used in any of its tire members, and may be produced by an ordinary method. The tire may be filled with ordinary air or air with an adjusted partial pressure of oxygen, or may be filled with an inert gas such as nitrogen, argon, or helium.

<Other Rubber Articles>

The foregoing rubber composition according to the present disclosure may be used in rubber articles (hereafter referred to as "other rubber articles") other than tires.

Non-limiting examples of the other rubber articles include anti-vibration rubbers, seismic isolation rubbers, crawlers, belts, and hoses.

Examples

The presently disclosed techniques will be described in more detail below by way of examples, although the present disclosure is not limited to the examples below.

<Copolymer Analysis>

The following methods were used to measure the number-average molecular weight (Mn), weight-average molecular weight (Mw), molecular weight distribution (Mw/Mn), butadiene unit content, ethylene unit content, styrene unit content, melting point, endothermic peak energy, glass transition temperature, and degree of crystallinity of each copolymer synthesized as described below and determine the main chain structure.

(1) Number-Average Molecular Weight (Mn), Weight-Average Molecular Weight (Mw), and Molecular Weight Distribution (Mw/Mn)

The number-average molecular weight (Mn), weight-average molecular weight (Mw), and molecular weight distribution (Mw/Mn) of the copolymer in terms of polystyrene were determined by gel permeation chromatography [GPC: HLC-8121GPC/HT produced by Tosoh Corporation, column: 2 GMHHR-H(S)HT columns produced by Tosoh Corporation, detector: differential refractometer (RI)] with respect to monodisperse polystyrene. The measurement temperature was 40° C.

(2) Butadiene Unit Content, Ethylene Unit Content, Styrene Unit Content

The contents (mol %) of a butadiene unit, an ethylene unit, and a styrene unit in the copolymer were determined from the integral ratio of each peak of a $^1$H-NMR spectrum (100° C., d-tetrachloroethane standard: 6 ppm).

(3) Melting Point ($T_m$)

The melting point of the copolymer was measured in accordance with JIS K 7121-1987, using a differential scanning calorimeter (DSC, "DSCQ2000" produced by TA Instruments Japan Inc.).

(4) Endothermic Peak Energy

The endothermic peak energy from 0° C. to 120° C. when increasing the temperature from −150° C. to 150° C. at a heating rate of 10° C./min (i.e. during first run) was measured in accordance with JIS K 7121-1987, using a differential scanning calorimeter (DSC, "DSCQ2000" produced by TA Instruments Japan Inc.).

(5) Glass Transition Temperature (Tg)

The glass transition temperature (Tg) of the copolymer was measured in accordance with JIS K 7121-1987, using a differential scanning calorimeter (DSC, "DSCQ2000" produced by TA Instruments Japan Inc.).

(6) Degree of Crystallinity

The crystal melting energy of polyethylene of 100% crystal component and the melting peak energy of the obtained copolymer were measured, and the degree of crystallinity was calculated from the energy ratio between the polyethylene and the copolymer. Here, the melting peak energy was measured using a differential scanning calorimeter (DSC, "DSCQ2000" produced by TA Instruments Japan Inc.).

(7) Determination of Main Chain Structure

A $^{13}$C-NMR spectrum was measured for the synthesized copolymer.

(Terpolymer Synthesis Method)

160 g of styrene and 600 mL of toluene were added into a sufficiently dried 1000 mL pressure-resistant stainless steel reactor.

In a glove box in a nitrogen atmosphere, 0.25 mmol of mono(bis(1,3-tert-butyldimethylsilyl)indenyl)bis(bis(dimethylsilyl)amide gadolinium complex {1,3-[(t-Bu)Me$_2$Si]$_2$C$_9$H$_5$Gd[N(SiHMe$_2$)$_2$]$_2$}, 0.275 mmol of dimethylaniliniumtetrakis(pentafluorophenyl)borate [Me$_2$NHPhB(C$_6$F$_5$)$_4$], and 1.1 mmol of diisobutyl aluminum hydride were added into a glass container and dissolved in 40 mL of toluene, to yield a catalyst solution.

The catalyst solution was added into the pressure-resistant stainless steel reactor, and heated to 70° C.

Next, ethylene was added into the pressure-resistant stainless steel reactor at a pressure of 1.5 MPa, further 80 mL of a toluene solution containing 20 g of 1,3-butadiene was added into the pressure-resistant stainless steel reactor for 8 hr, and copolymerization was performed at 70° C. for a total of 8.5 hr.

Next, 1 ml of an isopropanol solution of 5 mass % of 2,2'-methylene-bis(4-ethyl-6-t-butylphenol) (NS-5) was added into the pressure-resistant stainless steel reactor, to terminate the reaction.

Following this, a large amount of methanol was used to separate a copolymer, which was then vacuum dried at 50° C. to obtain a terpolymer.

The number-average molecular weight (Mn), weight-average molecular weight (Mw), molecular weight distribution (Mw/Mn), butadiene unit content, ethylene unit content, styrene unit content, melting point ($T_m$), endothermic peak energy, glass transition temperature (Tg), and degree of crystallinity of the obtained terpolymer were measured by the foregoing methods. The results are listed in Table 1.

Moreover, the main chain structure of the obtained terpolymer was determined by the foregoing method. Since no peak was observed from 10 ppm to 24 ppm in the $^{13}$C-NMR spectrum chart, it was determined that the main chain of the synthesized terpolymer consists only of an acyclic structure.

TABLE 1

|  |  | Terpolymer |
| --- | --- | --- |
| Number-average molecular weight (Mn) | ×10$^3$ | 163 |
| Weight-average molecular weight (Mw) | ×10$^3$ | 399 |
| Molecular weight distribution (Mw/Mn) | — | 2.4 |
| Butadiene unit content | mol % | 8 |
| Ethylene unit content | mol % | 85 |
| Styrene unit content | mol % | 7 |
| Melting point | ° C. | 63 |
| Endothermic peak energy | J/g | 43.1 |
| Glass transition temperature | ° C. | −28 |
| Degree of crystallinity | % | 14.7 |

(Synthesis of ethylene-1-hexene Copolymers A to C)

(A) 50.0 g (0.59 mol) of 1-hexene as an α olefin compound and 300 g of toluene were added into a sufficiently dried 2000 mL pressure-resistant stainless steel reactor. In a glove box in a nitrogen atmosphere, 18.7 mg (0.03 mmol) of (1-benzildimethylsilyl)cyclopenta[1]phenanthrene[bis(trimethylsilypmethyl)methyl] scandium complex [1-(C$_6$H$_5$CH$_2$Me$_2$Si)C$_{17}$H$_{10}$]Sc[(CH$_2$SiMe$_3$)$_2$] (THF), tritylterrakis(pentafluorophenyl)borate [Ph$_3$CB(C$_6$F$_5$)$_4$] (28.0 mg, 0.03 mmol), and 0.50 mmol of triisobutyl aluminum were added, and 20 mL of toluene was added to yield a catalyst solution.

The catalyst solution was added into the pressure-resistant stainless steel reactor, and heated to 60° C. Following this, under ethylene pressure (0.15 MPa to 0.20 MPa), copolymerization was performed for 90 min.

After the copolymerization, 1 mL of an isopropanol solution of 5 mass % of 2,2'-methylene-bis(4-ethyl-6-t-butylphenol) (NS-5) was added into the pressure-resistant stainless steel reactor, to terminate the reaction. Following this, a large amount of methanol was used to separate a copolymer, which was then vacuum dried at 50° C. to obtain an ethylene-1-hexene copolymer A.

(B) For an ethylene-1-hexene copolymer B, synthesis was performed under the same conditions as the ethylene-1-hexene copolymer A except that the copolymerization temperature was 40° C.

(C) For an ethylene-1-hexene copolymer C, synthesis was performed under the same conditions as the ethylene-1-hexene copolymer A except that 19.7 mg (0.03 mmol) of (1-benzildimethylsilyl)cyclopenta[1]phenanthrene[bis(trimethylsilyl)methyl] scandium complex [1-(C$_6$H$_5$CH$_2$Me$_2$Si)C$_{17}$H$_{10}$]Sc[(CH$_2$SiMe$_3$)$_2$] (THF) was added and the polymerization temperature was 40° C.

The number-average molecular weight, weight-average molecular weight, molecular weight distribution, and component content ratio (mol %) of each of the obtained ethylene-1-hexene copolymers A to C are listed in Table 2.

(Synthesis of ethylene-styrene Copolymers A to C)

(A) In a glove box in a nitrogen atmosphere, 0.04 mmol of tris[N,N-bis(trimethylsilyl)amide] gadolinium, 0.044 mmol of (1-benzildimethylsilyl3-methylpropyl)indene, and 0.28 mmol of trimethyl aluminum were added into a glass container, and 4 mL of hexane was added to yield a catalyst solution. The catalyst solution was stirred at room temperature for 96 hr or more.

46.0 g (0.44 mol) of styrene and 200 g of toluene were added into a sufficiently dried 2000 mL pressure-resistant stainless steel reactor. In a glove box in a nitrogen atmosphere, the catalyst solution, 0.044 mmol of dimethylaniliniumtetrakis(pentafluorophenyl)borate [Me$_2$NHPhB(C$_6$F5)$_4$], and 6.0 mmol of diisobutyl aluminum hydride (DIBAL) were added, and 20 mL of toluene was added to yield a catalyst solution.

The catalyst solution was added into the pressure-resistant stainless steel reactor, and heated to 100° C. Following this, under ethylene pressure (1.0 MPa) which was closed after 15 min, copolymerization was performed for 60 min.

After the copolymerization, 1 mL of an isopropanol solution of 5 mass % of 2,2'-methylene-bis(4-ethyl-6-t-butylphenol) (NS-5) was added into the pressure-resistant stainless steel reactor, to terminate the reaction. Following this, a large amount of methanol was used to separate a copolymer, which was then vacuum dried at 50° C. to obtain an ethylene-styrene copolymer A.

(B) For an ethylene-styrene copolymer B, synthesis was performed under the same conditions as the ethylene-styrene copolymer A except that the charge amount of DIBAL was 4.0 mmol and the polymerization time was 90 min.

(C) For an ethylene-styrene copolymer C, synthesis was performed under the same conditions as the ethylene-styrene copolymer A except that the charge amount of DIBAL was 2.0 mmol and the polymerization time was 45 min.

The number-average molecular weight, weight-average molecular weight, molecular weight distribution, and component content ratio (mol %) of each of the obtained ethylene-styrene copolymers A to C are listed in Table 2.

TABLE 2

|  |  | Ethylene-1-hexene copolymer A | Ethylene-1-hexene copolymer B | Ethylene-1-hexene copolymer C | Ethylene-styrene copolymer A | Ethylene-styrene copolymer B | Ethylene styrene copolymer C |
|---|---|---|---|---|---|---|---|
| Number-average molecular weight: Mn | kDa | 1 | 3.8 | 9.3 | 3.5 | 5.8 | 8 |
| Weight-average molecular weight: Mw | kDa | 5 | 13 | 25 | 5.1 | 7.6 | 12 |
| Molecular weight distribution | — | 5 | 3.3 | 2.7 | 1.45 | 1.31 | 1.5 |
| Ethylene | mol % | 85.4 | 84.2 | 82.5 | 80.7 | 81.3 | 82.5 |
| Hexene | mol % | 14.6 | 15.8 | 17.5 | — | — | — |
| Styrene | mol % | — | — | — | 19.3 | 18.7 | 17.5 |

<Samples 1 to 19 of Rubber Compositions>

Samples of rubber compositions were produced using a typical Banbury mixer in accordance with the formulations listed in Table 2. The obtained samples were each vulcanized at 160° C. for 15 min to yield a vulcanized rubber, and then the following evaluation was performed. The results are listed in Table 3.

<Evaluation>

(1) Unvulcanized Viscosity (Mooney Viscosity)

The Mooney viscosity of the rubber composition of each sample at 100° C. was measured in accordance with JIS K 6300-1 (2001).

In the evaluation, an index with the Mooney viscosity of sample 5 being 100 was used. A smaller index value indicates lower unvulcanized viscosity and higher operability. The evaluation results are listed in Table 3.

(2) Tear Strength

The rubber composition of each sample is vulcanized at 160° C. for 15 min to obtain a vulcanized rubber, and the tear strength (MPa) is measured in trouser form according to JIS K6252 using a tensile tester (Shimadzu Corporation).

In the evaluation, an index with the tear strength of sample 5 being 100 is used. A larger index value indicates better crack resistance and better breaking resistance.

TABLE 3

| | Sample | | 1 Comparative Example | 2 Comparative Example | 3 Comparative Example | 4 Comparative Example | 5 Comparative Example | 6 Comparative Example | 7 Comparative Example | 8 Comparative Example |
|---|---|---|---|---|---|---|---|---|---|---|
| Formulation | Natural rubber *1 | Parts By mass | 100 | 70 | 70 | 70 | — | — | — | — |
| | Terpolymer *2 | | — | 30 | 30 | 30 | 100 | 100 | 100 | 100 |
| | LIR30 *3 | | — | — | — | — | — | — | 50 | — |
| | LIR50 *4 | | — | — | — | — | — | — | — | 50 |
| | Ethylene-styrene copolymer A *5 | | — | — | — | — | — | — | — | — |
| | Ethylene-styrene copolymer B *5 | | — | — | — | — | — | — | — | — |
| | Ethylene-styrene copolymer C *5 | | — | — | — | — | — | — | — | — |
| | Ethylene-1-hexene copolymer A *7 | | — | — | — | — | — | — | — | — |
| | Ethylene-1-hexene copolymer B *7 | | — | — | — | — | — | — | — | — |
| | Ethylene-1-hexene copolymer C *7 | | — | — | — | — | — | — | — | — |
| | Ethylene-α olefin oligomer A *6 | | — | — | — | — | — | — | — | — |
| | Ethylene-α olefin oligomer B *6 | | — | — | — | — | — | — | — | — |
| | Ethylene-α olefin oligomer C *6 | | — | — | — | — | — | — | — | — |
| | Ethylene-α olefin oligomer D *6 | | — | — | — | — | — | — | — | — |
| | Carbonblack *8 | | 55 | 55 | 55 | 55 | 55 | 55 | 55 | 55 |
| | Process oil *10 | | 10 | 10 | 50 | 50 | 10 | 50 | 10 | 10 |
| | Stearic acid | | 2 | 2 | 2 | 2 | 2 | 2 | 2 | 2 |
| | Wax *11 | | 2.0 | 2.0 | 2.0 | 2.0 | 2.0 | 2.0 | 2.0 | 2.0 |
| | Age resistor *12 | | 1.0 | 1.0 | 1.0 | 1.0 | 1.0 | 1.0 | 1.0 | 1.0 |
| | Sulfur | | 1.2 | 1.2 | 1.2 | 1.2 | 1.2 | 1.2 | 1.2 | 1.2 |
| | Vulcanization accelerator DPG *13 | | — | — | — | — | — | — | — | — |
| | Vulcanization accelerator MBTS *14 | | 1.6 | 1.6 | 1.6 | 1.6 | 1.6 | 1.6 | 1.6 | 1.6 |
| | Vulcanization accelerator NS *15 | | 0.56 | 0.56 | 0.56 | 0.56 | 0.56 | 0.56 | 0.56 | 0.56 |
| | Zinc oxide *16 | | 2.5 | 2.5 | 2.5 | 2.5 | 2.5 | 2.5 | 2.5 | 2.5 |

TABLE 3-continued

| Evaluation result | Unvulcanized viscosity (Mooney viscosity) | Index | 67 | 90 | 38 | 35 | 100 | 53 | 22 | 60 |
| --- | --- | --- | --- | --- | --- | --- | --- | --- | --- | --- |
| | Tear strength | Index | 83 | 89 | 91 | 94 | 100 | 98 | 73 | 78 |

| | Sample | | 9 Example | 10 Example | 11 Example | 12 Example | 13 Example | 14 Example | 15 Example | 16 Example | 17 Example | 18 Example | 19 Example |
| --- | --- | --- | --- | --- | --- | --- | --- | --- | --- | --- | --- | --- | --- |
| Formulation | Natural rubber *1 | Parts By mass | — | — | — | — | — | — | — | — | — | — | — |
| | Terpolymer *2 | | 100 | 100 | 100 | 100 | 100 | 100 | 100 | 100 | 100 | 100 | 100 |
| | LIR30 *3 | | — | — | — | — | — | — | — | — | — | — | — |
| | LIR50 *4 | | — | — | — | — | — | — | — | — | — | — | — |
| | Ethylene-styrene copolymer A *5 | | — | — | — | 50 | — | — | — | — | — | — | — |
| | Ethylene-styrene copolymer B *5 | | — | — | — | — | 50 | — | — | — | — | — | — |
| | Ethylene-styrene copolymer C *5 | | — | — | — | — | — | 50 | — | — | — | — | — |
| | Ethylene-1-hexene copolymer A *7 | | 50 | — | — | — | — | — | — | — | — | — | — |
| | Ethylene-1-hexene copolymer B *7 | | — | 50 | — | — | — | — | — | — | — | — | — |
| | Ethylene-1-hexene copolymer C *7 | | — | — | 50 | — | — | — | — | — | — | — | — |
| | Ethylene-α olefin oligomer A *6 | | — | — | — | — | — | — | 50 | — | — | — | — |
| | Ethylene-α olefin oligomer B *6 | | — | — | — | — | — | — | — | 30 | 50 | — | — |
| | Ethylene-α olefin oligomer C *6 | | — | — | — | — | — | — | — | — | — | 50 | — |
| | Ethylene-α olefin oligomer D *6 | | — | — | — | — | — | — | — | — | — | — | 50 |
| | Carbonblack *8 | | 55 | 55 | 55 | 55 | 55 | 55 | 55 | 55 | 55 | 55 | 55 |
| | Process oil *10 | | 10 | 10 | 10 | 10 | 50 | 50 | 50 | 50 | 50 | 50 | 50 |
| | Stearic acid | | 2 | 2 | 2 | 2 | 2 | 2 | 2 | 2 | 2 | 2 | 2 |
| | Wax *11 | | 2.0 | 2.0 | 2.0 | 2.0 | 2.0 | 2.0 | 2 | 2 | 2 | 2 | 2 |
| | Age resistor *12 | | 1.0 | 1.0 | 1.0 | 1.0 | 1.0 | 1.0 | 1 | 1 | 1 | 1 | 1 |
| | Sulfur | | 1.2 | 1.2 | 1.2 | 1.2 | 1.2 | 1.2 | 1.2 | 1.2 | 1.2 | 1.2 | 1.2 |
| | Vulcanization accelerator DPG *13 | | — | — | — | — | — | — | — | — | — | — | — |
| | Vulcanization accelerator MBTS *14 | | 1.6 | 1.6 | 1.6 | 1.6 | 1.6 | 1.6 | 1.6 | 1.6 | 1.6 | 1.6 | 1.6 |
| | Vulcanization accelerator NS *15 | | 0.56 | 0.56 | 0.56 | 0.56 | 0.56 | 0.56 | 0.56 | 0.56 | 0.56 | 0.56 | 0.56 |
| | Zinc oxide *16 | | 2.5 | 2.5 | 2.5 | 2.5 | 2.5 | 2.5 | 2.5 | 2.5 | 2.5 | 2.5 | 2.5 |
| Evaluation result | Unvulcanized viscosity (Mooney viscosity) | Index | 69 | 53 | 66 | 37 | 37 | 51 | 28 | 51 | 23 | 7 | 19 |
| | Tear strength | Index | 106 | 103 | 102 | 107 | 107 | 107 | 104 | 102 | 105 | 103 | 105 |

*1 Natural rubber: TSR20
*2 Terpolymer: terpolymer synthesized by the foregoing method
*3 LIR30: liquid polyisoprene rubber (rubber plasticizer), product name "LIR30" produced by Kuraray Co., Ltd.
*4 LIR50: liquid polyisoprene rubber (rubber plasticizer), product name "LIR50" produced by Kuraray Co., Ltd.
*5 Ethylene-styrene copolymers A to C: ethylene-styrene copolymers A to C synthesized by the foregoing methods
*6 Ethylene-α olefin oligomer A: product name "LUCANT ® LX004" produced by Mitsui Chemicals Co., Ltd. (LUCANT is a registered trademark in Japan, other countries, or both), Mw: 3000, Mn: 1500, MWD: 1.9
Ethylene-α olefin oligomer B: product name "LUCANT ® LX020" produced by Mitsui Chemicals Co., Ltd., Mw: 5600, Mn: 2600, MWD: 2.2
Ethylene-α olefin oligomer C: product name "LUCANT ® LX200" produced by Mitsui Chemicals Co., Ltd., Mw: 13000, Mn: 5000, MWD: 1.8
Ethylene-α olefin oligomer D: product name "LUCANT ® LX900Z" produced by Mitsui Chemicals Co., Ltd., Mw: 19000, Mn: 7500, MWD: 1.7
*7 Ethylene-1-hexene copolymers A to C: ethylene-1-hexene copolymers A to C synthesized by the foregoing methods
*8 Carbon black: SAF grade carbon black, product name "ASAHI#105" produced by Asahi Carbon Co., Ltd.
*10 Process oil: petroleum hydrocarbon process oil, product name "DAIANA PROCESS OIL NS-28" produced by Idemitsu Kosan Co., Ltd.,
*11 Wax: microcrystalline wax, produced by Seiko-Chemical Co.
*12 Age resistor: product name "NOCRAC 6C" produced by Ouchi Shinko Chemical Industrial Co., Ltd.
*13 Vulcanization accelerator DPG: product name "NOCCELER D" produced by Ouchi Shinko Chemical Industrial Co., Ltd.
*14 Vulcanization accelerator MBTS: di-2-benzothiazolyl disulfide, product name "NOCCELER DM-P" produced by Ouchi Shinko Chemical Industrial Co., Ltd.
*15 Vulcanization accelerator NS: N-tert-butyl-2-benzothiazolyl sulfeneamide, product name "NOCCELER NS-P(NS)" produced by Ouchi Shinko Chemical Industrial Co., Ltd.
*16 Zinc oxide: produced by Hakusui Tech Co., Ltd.

As can be understood from the results listed in Table 3, the rubber compositions in Examples according to the present disclosure had favorable evaluation results in unvulcanized viscosity and tear strength, thus achieving both operability and crack resistance at high level.

INDUSTRIAL APPLICABILITY

It is therefore possible to provide a rubber composition that can achieve excellent breaking resistance while having high operability.

It is also possible to provide a tire having high operability in production and excellent breaking resistance.

The invention claimed is:

1. A rubber composition comprising:
a rubber component containing a multicomponent copolymer that contains a conjugated diene unit, a non-conjugated olefin unit, and an aromatic vinyl unit; and
at least one selected from an ethylene-α olefin copolymer and an ethylene-aromatic vinyl copolymer each having a number-average molecular weight (Mn) of 500 to 30,000.

2. The rubber composition according to claim 1, wherein a content of the at least one selected from the ethylene-α olefin copolymer and the ethylene-aromatic vinyl copolymer is 10 parts to 80 parts by mass with respect to 100 parts by mass of the rubber component.

3. The rubber composition according to claim 1, wherein a carbon number of an α-olefin in the ethylene-α olefin copolymer is 3 to 20.

4. The rubber composition according to claim 1, wherein a molecular weight distribution of the at least one selected from the ethylene-α olefin copolymer and the ethylene-aromatic vinyl copolymer is in a range of 1 to 5.

5. The rubber composition according to claim 1, wherein the rubber composition includes at least the ethylene-α olefin copolymer having a number-average molecular weight (Mn) of 500 to 30,000, and a content of the ethylene-α olefin copolymer is 10 parts to 80 parts by mass with respect to 100 parts by mass of the rubber component.

6. The rubber composition according to claim 1, wherein the rubber composition includes at least the ethylene-aromatic vinyl copolymer having a number-average molecular weight (Mn) of 500 to 30,000, and a content of the ethylene-aromatic vinyl copolymer is 10 parts to 80 parts by mass with respect to 100 parts by mass of the rubber component.

7. The rubber composition according to claim 1, wherein an aromatic vinyl in the ethylene-aromatic vinyl copolymer is styrene.

8. The rubber composition according to claim 1, wherein a content of the multicomponent copolymer in the rubber component is 10 mass % or more.

9. The rubber composition according to claim 1, wherein in the multicomponent copolymer, a content of the conjugated diene unit is 1 mol % to 50 mol %, a content of the non-conjugated olefin unit is 40 mol % to 97 mol %, and a content of the aromatic vinyl unit is 2 mol % to 35 mol %.

10. The rubber composition according to claim 1, wherein an endothermic peak energy of the multicomponent copolymer from 0° C. to 120° C. measured by a differential scanning calorimeter (DSC) is 10 J/g to 150 J/g.

11. The rubber composition according to claim 1, wherein a melting point of the multicomponent copolymer measured by a differential scanning calorimeter (DSC) is 30° C. to 130° C.

12. The rubber composition according to claim 1, wherein a glass transition temperature of the multicomponent copolymer measured by a differential scanning calorimeter (DSC) is 0° C. or less.

13. The rubber composition according to claim 1, wherein a degree of crystallinity of the multicomponent copolymer is 0.5% to 50%.

14. The rubber composition according to claim 1, wherein a main chain of the multicomponent copolymer consists only of an acyclic structure.

15. The rubber composition according to claim 1, wherein in the multicomponent copolymer, the non-conjugated olefin unit consists only of an ethylene unit.

16. The rubber composition according to claim 1, wherein in the multicomponent copolymer, the aromatic vinyl unit contains a styrene unit.

17. The rubber composition according to claim 1, wherein in the multicomponent copolymer, the conjugated diene unit contains one or both of a 1,3-butadiene unit and an isoprene unit.

18. A tire produced using the rubber composition according to claim 1.

19. The rubber composition according to claim 2, wherein a carbon number of an α-olefin in the ethylene-α olefin copolymer is 3 to 20.

20. The rubber composition according to claim 2, wherein a molecular weight distribution of the at least one selected from the ethylene-α olefin copolymer and the ethylene-aromatic vinyl copolymer is in a range of 1 to 5.

* * * * *